US012580212B2

(12) United States Patent　　　　(10) Patent No.:　US 12,580,212 B2
Lavertu et al.　　　　　　　　　　　(45) **Date of Patent:　\*Mar. 17, 2026**

(54) ENERGY MANAGEMENT FOR POWER SYSTEM

(71) Applicant: Transportation IP Holdings, LLC, Norwalk, CT (US)

(72) Inventors: Thomas Michael Lavertu, Ballston Lake, NY (US); Eric Richard Dillen, Edinboro, PA (US); Adam Edgar Klingbeil, Ballston Lake, NY (US); Gayathri Indra Seenumani, Niskayuna, NY (US); James D. Brooks, Grove City, PA (US); David Allen Eldredge, Melbourne, FL (US); Ajith Kuttannair Kumar, Ashburn, VA (US)

(73) Assignee: Transportation IP Holdings, LLC, Norwalk, CT (US)

( \* ) Notice: Subject to any disclaimer, the term of this patent is extended or adjusted under 35 U.S.C. 154(b) by 180 days.

This patent is subject to a terminal disclaimer.

(21) Appl. No.: 18/511,551

(22) Filed: Nov. 16, 2023

(65) Prior Publication Data

US 2024/0088418 A1　　Mar. 14, 2024

Related U.S. Application Data

(63) Continuation-in-part of application No. 17/646,131, filed on Dec. 27, 2021, now Pat. No. 12,194,889, and a continuation-in-part of application No. 18/155,239, filed on Jan. 17, 2023, now Pat. No. 12,351,067, which is a continuation-in-part of application No.

(Continued)

(51) Int. Cl.
| | | |
|---|---|---|
| *H01M 8/04858* | (2016.01) | |
| *B60L 58/12* | (2019.01) | |
| *B60L 58/30* | (2019.01) | |
| *B60L 58/40* | (2019.01) | |

(Continued)

(52) U.S. Cl.
CPC .......... *H01M 8/04932* (2013.01); *B60L 58/12* (2019.02); *B60L 58/30* (2019.02); *B60L 58/40* (2019.02); *H01M 8/0444* (2013.01); *H01M 8/04567* (2013.01); *H01M 8/0488* (2013.01); *H01M 8/04947* (2013.01); *H01M 2250/20* (2013.01)

(58) Field of Classification Search
CPC .......... H01M 8/04932; H01M 8/0444; H01M 8/04567; H01M 8/0488; H01M 8/04947; H01M 2250/20; B60L 58/12; B60L 58/40; B60L 58/30
See application file for complete search history.

(56) References Cited

U.S. PATENT DOCUMENTS

| | | | | |
|---|---|---|---|---|
| 5,788,004 A | \* | 8/1998 | Friedmann | ............. B60W 20/10 |
| | | | | 318/143 |
| 6,757,590 B2 | \* | 6/2004 | Ross | ................. H02J 13/00016 |
| | | | | 429/432 |

(Continued)

*Primary Examiner* — Gertrude Arthur Jeanglaude

(74) *Attorney, Agent, or Firm* — K&L Gates LLP

(57) ABSTRACT

A system and method are provided for controlling a plurality of fuel cells. The method includes coordinating a distribution of a power demand in response to a power request of a power system comprising a plurality of fuel cells, the power output of each of the fuel cells selected based on a respective efficiency of each of the fuel cells.

20 Claims, 12 Drawing Sheets

Related U.S. Application Data

16/727,253, filed on Dec. 26, 2019, now Pat. No. 11,565,731.

(51) Int. Cl.
H01M 8/0444 (2016.01)
H01M 8/04537 (2016.01)

(56) References Cited

U.S. PATENT DOCUMENTS

| | | | |
|---|---|---|---|
| 7,444,944 B2 | 11/2008 | Kumar et al. | |
| 9,008,879 B2 | 4/2015 | Kumar et al. | |
| 9,254,797 B2 * | 2/2016 | Craig ......................... | B60L 1/00 |
| 12,194,889 B2 * | 1/2025 | Lavertu ................... | B60L 58/16 |
| 2012/0119576 A1 * | 5/2012 | Kesler ..................... | H02J 50/70 |
| | | | 307/9.1 |
| 2022/0266695 A1 | 8/2022 | Pressman et al. | |
| 2022/0271363 A1 | 8/2022 | Burkell et al. | |
| 2023/0202347 A1 | 6/2023 | Lavertu et al. | |

\* cited by examiner

ENERGY MANAGEMENT FOR POWER SYSTEM

CROSS REFERENCE TO RELATED APPLICATIONS

This application is a Continuation-in-Part of U.S. patent application Ser. No. 17/646,131, filed Dec. 27, 2021, now U.S. Pat. No. 12,194,889 issued Jan. 14, 2025, which is a Continuation-in-Part of U.S. patent application Ser. No. 18/155,239, filed on Jan. 17, 2023, now U.S. Pat. No. 12,351,067, issued Jul. 8, 2025; which is a Continuation-in-Part of U.S. patent application Ser. No. 16/727,253, filed on Dec. 26, 2019, now U.S. Pat. No. 11,565,731, issued Jan. 31, 2023. The above-referenced applications are incorporated herein by reference in each of their entirety.

BACKGROUND

Technical Field

Embodiments of the subject matter disclosed herein relate to energy management for a power system having more than one fuel cell.

Discussion of Art

Transportation systems, such as trains, may be powered by more than one power system for propulsion. For example, a train may be propelled by one or more of an engine system, a battery system, and a fuel cell system, where each system may include more than one power device, e.g., a power storage device or a power-producing device, of a respective type. The engine system may be formed of one or more engines installed at rail vehicles, e.g., locomotive, of the train, with the rail vehicles included in a consist or a group. The engines may include various types of engine, such as single fuel combusting and multi-fuel combusting internal combustion engines. Similarly, the battery system and the fuel cell system may include one or more batteries and one or more fuel cell modules, respectively, located at one or more rail vehicles of the consist.

The consist may draw power from each power system individually, in some examples, and/or draw power from the power systems in combination. In one example, the consist may be equipped with each of the engine system, the battery system, and the fuel cell system and propulsion may be provided by the engine system alone, the battery system alone, or the fuel cell system alone in some operating modes. In other, hybrid operating modes, the battery system may be a primary power system supplemented by the engine system, the fuel cell system may be the primary power system supplemented by the battery system, the engine system may be the primary power system supplemented by each of the fuel cell system and the battery system, etc.

When configured with more than one power system for propulsion, each power system may be utilized solely based on its power capabilities without coordinated and strategy distribution of loads amongst the power systems. As an example, loads applied to each power system, and each power device of the system, may be selected based on a maximum power output of each power system. In this manner, the power systems may be operated outside of an efficiency and power capacity range specific to the power system type, which may expedite degradation of the power system and shorten its useful life. It may be desirable to have a system and method that differs from those that are currently available.

BRIEF DESCRIPTION

In an embodiment, a system and method are provided for controlling a plurality of fuel cells. The method includes coordinating a distribution of a power demand in response to a power request of a power system comprising a plurality of fuel cells, the power output of each of the fuel cells selected based on a respective efficiency of each of the fuel cells.

In an embodiment, a system is provided that includes a power system having a plurality of fuel cells. Each of the fuel cells has an efficiency range. A controller can coordinate a distribution of a power demand of the power system in response to a power request. The power output of each of the fuel cells is selected based on a respective efficiency of each of the fuel cells.

In an embodiment, a vehicle is provided having one or more electric traction motors. A fuel cell system is electrically coupled to the electric traction motors, and the fuel cell system has a plurality of fuel cells. A controller has executable instructions stored on non-transitory memory that, when executed, cause the controller to individually operate the fuel cell modules at a determined efficiency setting to meet a power demand and to activate fuel cells sequentially until the power demand has been met. The determined efficiency can be set to be greater than 90 percent efficient in converting fuel to electricity.

DETAILED DESCRIPTION

Figure 1:
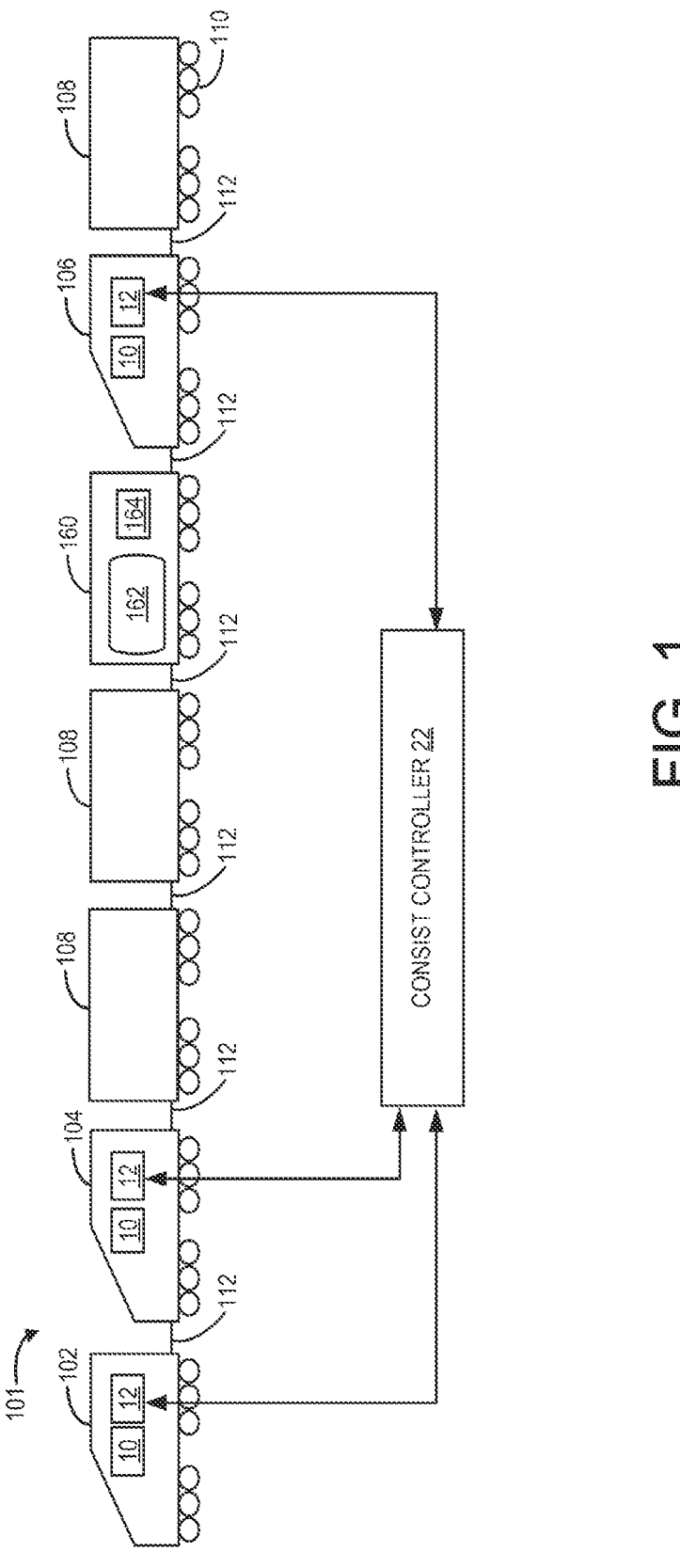
FIG. 1 shows an example embodiment of a train including a locomotive consist.

Aspects of the invention are disclosed in the following description and may relate to systems and methods for coordinating a distribution of a power demand in response to a power request of a power system, such as a fuel cell system. The fuel cell system may have a plurality of fuel cells, and the power output of each of the fuel cells may be controlled or selected based on determined factors, such as a respective efficiency of each of the fuel cells. In an embodiment, the method may control a plurality of fuel cells by coordinating a distribution of a power demand in response to a power request of a power system comprising a plurality of fuel cells, the power output of each of the fuel cells selected based on a respective efficiency of each of the fuel cells.

The method may operate in a system that has a power system, the power system has a plurality of fuel cells. Each of the fuel cells has an efficiency range. A controller can implement the method to coordinate a distribution of a power demand of the power system in response to a power request. The power output of each of the fuel cells can be selected based on a respective efficiency of each of the fuel cells.

In an embodiment, a system can be disposed in a vehicle having one or more electric traction motors. The power system (i.e., the fuel cell system) can be electrically coupled to the electric traction motors. A controller has executable instructions stored on non-transitory memory that, when executed, cause the controller to individually operate the fuel cell modules at a determined efficiency setting to meet a power demand and to activate fuel cells sequentially until the power demand has been met. The determined efficiency can be set to be a desired level, such as greater than 90 percent efficient in converting fuel to electricity.

These methods and systems may be useful for energy management in a transportation system. The transportation system may have a single vehicle or may be a group formed of a plurality of vehicles. An example of a suitable vehicle may be a rail vehicle. A suitable rail vehicle may be a locomotive equipped with at least one power system for propelling the consist, including a fuel cell system having one or more fuel cells.

In a consist there may be plural locomotives, and each locomotive may be dedicated to a specific propulsion system type powered by a specific power bank type. For example, one locomotive may include a single fuel (e.g., combusting one type of fuel) engine (e.g., a first power bank), one locomotive may carry the fuel cell system (e.g., a second power bank), another locomotive may be equipped with a battery that powers propulsion and (optionally) auxiliary loads of the locomotive (e.g., a third power bank), and another locomotive may have a multi-fuel engine combusting more than one type of fuel (e.g., a fourth power bank). In other embodiments, combinations of the power devices may be implemented at the locomotives, such as a locomotive equipped with an engine and a battery, a locomotive equipped with an engine and a fuel cell, and a locomotive equipped with a battery and a fuel cell. Furthermore, each locomotive of the consist may be differently configured from one another with respect to power devices. For example, one embodiment may include a consist having two locomotives each equipped with the engine system and one locomotive with a battery, or one locomotive with an engine, one locomotive with the fuel cell system and one locomotive with an engine and a battery, etc. Various combinations are possible but a strategy for energy management amongst the power banks may be similarly applied, as described herein.

A strategy for energy management may include coordinating operation of the power banks to optimize, e.g., operate each power bank or its power devices to maximize an overall system efficiency of the transportation system. This may be done while prolonging a useful life of the power devices. Life may be preserved by reducing or eliminating degradation to the battery system and fuel cell system. Degradation may be reduced by moderating a charge/discharge rate of the battery and efficiency may be improved by operating the fuel cell system within a target power output range. Distribution of a load, e.g., an amount of power demanded to provide a desired power output, amongst the power banks may therefore be adjusted to enable operation of each power bank at high efficiency and maintain an integrity of each power bank. The load adjustment may, in one embodiment, rely on a determined trip plan. This trip plan may designate or dictate operational settings of the loads at different times, locations, distances along routes, or the like, to reach one or more goals (e.g., efficiency of the power bank) subject to one or more constraints (e.g., increasing the useful life of the power bank or decreasing a rate at which the useful life of the power bank decreases). Trip conditions, such as terrain conditions, weather conditions, anticipated regions and duration of operation demanding high power vs lower power, etc., may be used to determine suitable operation of the power banks.

The technical effect of implementing the strategy for energy management of a consist as described herein is that losses leading to reduced efficiency of operation of the power bank is reduced while performance and/or efficiency of each component of the power bank is maintained higher over a longer duration of time.

An approach described herein may be employed in a variety of system types. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles and off-highway vehicles (OHV), and the like. Suitable on-road vehicles can include automobiles, buses, and semi-trucks. Off road vehicles can include mining equipment, marine vessels, rail vehicles, agricultural vehicles, and the like. For clarity of illustration, a locomotive is provided as an example of a rail vehicle type mobile platform supporting a system incorporating at least one embodiment of the invention.

Before further discussion of the methods for energy management of a transportation system, an example transportation system platform in which the methods may be implemented is shown. FIG. 1 depicts an example train 100, including a plurality of rail vehicles 102, 104, 106, a fuel tender 160, and cars 108, that can run on a track 114. The plurality of rail vehicles, the fuel tender, and the cars are coupled to each other through couplers 112. In one example, the plurality of rail vehicles may be locomotives, including a lead locomotive and one or more remote locomotives. While the depicted example shows three locomotives and four cars, any appropriate number of locomotives and cars may be included in the train. Further, just as vehicles may logically or mechanically couple to form a vehicle group, locomotives in the train may mechanically and communicatively couple to form a consist. For example, in the embodiment depicted, the locomotives may form a consist or group 101. Various vehicle types may form various types of vehicle groups (such as consists, convoys, swarms, fleets, platoons, and the like). The vehicles in a group may be coupled together mechanically and/or virtually.

In some examples, the consist may include successive locomotives, e.g., where the locomotives are arranged sequentially without cars positioned in between. In other examples, as illustrated in FIG. 1, the locomotives may be separated by one or more cars in a configuration enabling distributed power operation. In this configuration, throttle and braking commands may be relayed from the lead locomotive to the remote locomotives by a radio link or physical cable, for example. The lead locomotive may communicate with wayside devices, and in some examples therethrough to back office systems, to determine whether they have one or more of movement authority, movement restrictions, speed limits, noise or emission limits, and the like.

The locomotives may be powered by a power bank 10 in one embodiment, as well as alternatively by a battery, internal combustion engine, and/or a combination thereof, as described further below, in other embodiments. The cars may be unpowered. A suitable power bank may be a fuel cell bank, and may include a plurality of fuel cells, the number and selection of such fuel cells may be made with reference to end use requirements and available fuel cell capacity and technology. As fuel cell power output capability increases, fewer fuel cells may be necessary to achieve a sufficient total power output. Fuel cells may be proton exchange membrane (PEM) type, solid oxide fuel cell (SOFC) type, or other, selected with reference to end use requirements. A suitable fuel may use hydrogen, hydrocarbon, urea, and the like. A suitable engine may be a multi-fuel engine. For example, the engine may combust gaseous and/or liquid fuels with different amounts of carbon, and in varying ratios of the fuels relative to each other. In some examples, the multi-fuel engine may be specifically a dual-fuel engine to combust two fuels, either of which may be a gaseous or liquid fuel that is hydrocarbon or non-hydrocarbon based. In other examples, the engine may be a single-fuel engine that can combust a gaseous or a liquid fuel.

The vehicle group, in this case a train, may have a control system. The control system may include a power bank controller 12, and the control system may include a vehicle group controller 22. As depicted in FIG. 1, each locomotive shown includes a both power bank and a power bank controller. The power bank controller may communicate with the vehicle group controller. The vehicle group controller may be located on one vehicle of the train, such as the lead locomotive, or may be remotely located, for example at a dispatch center. The vehicle group controller may receive information from, and transmit signals to, each of the locomotives of the consist. For example, the vehicle group controller may receive signals from a variety of sensors on the train and adjust train operations accordingly. The vehicle group controller is also coupled to each power bank controller for adjusting power bank operations of each locomotive.

The train may include at least one fuel tender, which may carry one or more fuel storage reservoirs 162 and includes a fuel tender controller 164. While the fuel tender is positioned in front of the remote locomotive 106, other examples may include alternate locations of the fuel tender along the train. For example, the fuel tender may be instead positioned behind the remote locomotive or between the lead locomotive and the remote locomotive, or behind the remote locomotive.

Figure 2:
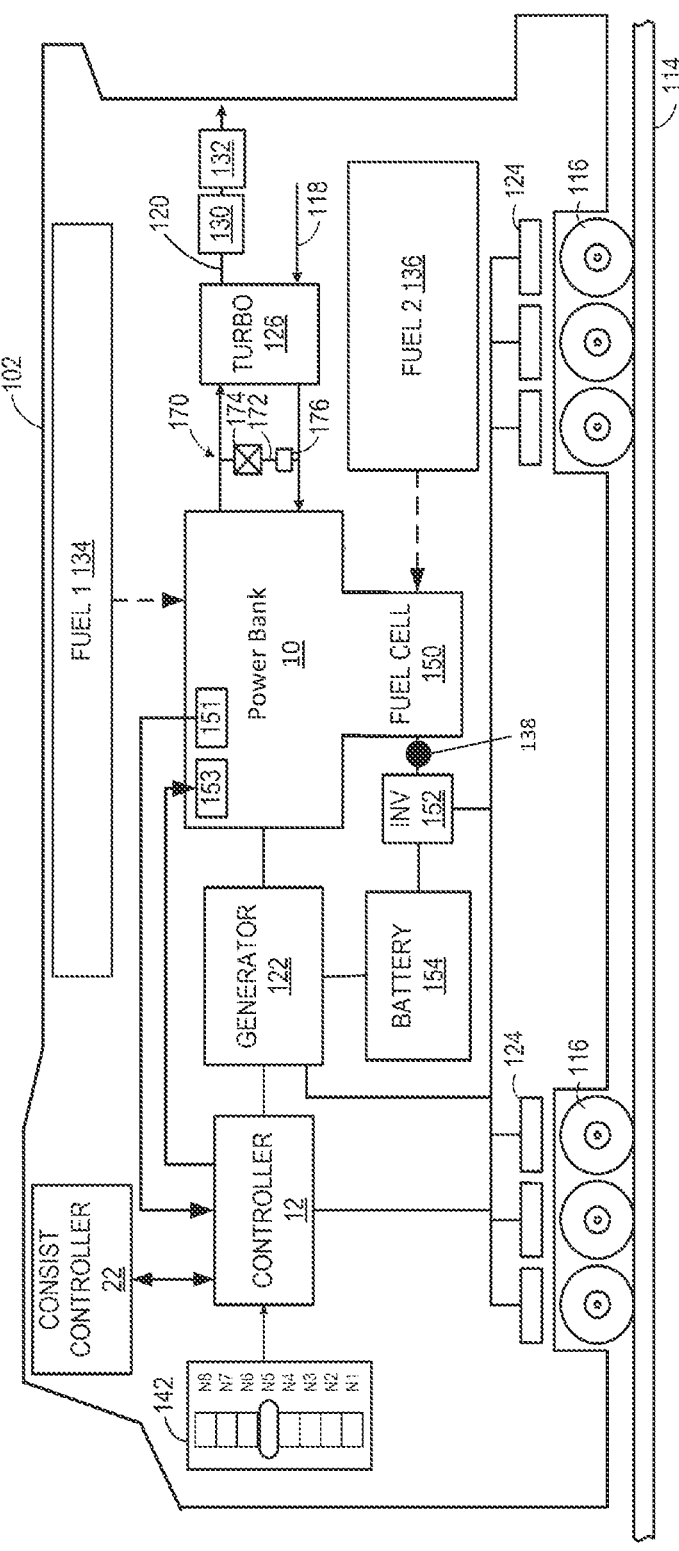
FIG. 2. shows a schematic diagram of an example embodiment of a locomotive from FIG. 1 with a dual fuel engine configured to combust hydrogen.

In one example, the fuel tender may be un-powered, e.g., without power or electric traction motors (e.g., electric traction motors 124 shown in FIG. 2). However, in other examples, the fuel tender may be powered for propulsion. For example, as shown in FIG. 2, the fuel tender may include a power bank. The power bank of the fuel tender may combust the fuel stored in the fuel storage reservoir and/or fuel stored at another vehicle of the train.

The fuel storage reservoir may have a suitable structure for storing a specific type of fuel. In one example, the fuel storage reservoir may be adapted for cryogenic storage of liquefied natural gas (LNG) or liquefied hydrogen. As another example, the fuel storage reservoir may be used to store a fuel in a liquid state at ambient temperature and pressure, such as diesel or ammonia. In yet another example, the fuel storage reservoir may store a fuel as a compressed gas, such as hydrogen or natural gas. In one example, the fuel is stored as a solid, and can be converted to a gas on demand (such as with a hydrogen generator). In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, fuel may be stored both at the fuel tender and at one or more of the locomotives, e.g., as shown in FIG. 2. In addition, in some instances, the fuel tender itself may both store a fuel cell and one or more tanks of hydrogen fuel. However, at least one fuel cell system should be located on the locomotive, as shown in FIG. 2.

FIG. 2 depicts an example embodiment of a locomotive as part of a train that can run on the track 114 via a plurality of wheels 116. Power for propulsion of the locomotive may be supplied at least in part by the power bank. The power bank receives intake air as needed from an intake passage 118. A compressor (not shown) may be used to control pressure of the supplied air. The intake passage receives ambient air from an air filter (not shown) that filters air from outside of the locomotive. Exhaust gas resulting from power generation is supplied to an exhaust passage 120. Exhaust gas (e.g., water vapor) flows through the exhaust passage, and out of an exhaust stack (not shown) of the locomotive.

As depicted in FIG. 2, the power bank may receive a first fuel from a first fuel reservoir 134 and a second fuel from a second fuel reservoir 136. While the locomotive shown is equipped with two fuel reservoirs in FIG. 2, in other examples, the locomotive may include only one fuel reservoir or no fuel reservoir and may accept a singular fuel from a fuel tender. For example, at least one of the fuel reservoirs may be stored at the fuel tender, e.g., the fuel tender 160 of FIG. 1. Even in situations where all the fuel is of the same type, the fuel reservoirs may store the fuel in different states (liquid, solid, gas), and even if both fuel reservoirs store the fuel in the same state (e.g., gas), the fuel reservoirs may store the fuels at pressures (and/or temperatures) that differ from each other. Pumps and compressors and pressure regulators, along with piping and valving systems, may allow for fueling and fuel supply as needed.

Alternatively, at least one additional fuel, e.g., a third fuel, may be stored at the fuel tender in addition to the first fuel at the first fuel reservoir and the second fuel at the second fuel reservoir of the locomotive. If an auxiliary generator is present, one of the fuels may be used to run the auxiliary generator. In one example, fuels which may be stored at ambient pressure and temperature without any additional equipment or specialized storage tank configurations, such as diesel or gasoline for the auxiliary generator, may be stored at the locomotive. Fuels demanding specialized equipment, such as for cryogenic or high pressure storage, may be stored on-board the fuel tender. In other examples, however, the locomotive and the fuel tender may each store fuels that do not demand specialized equipment. Storing compressed fuel cylinders on the locomotive may be desirable in some configurations.

The first, second, and third fuels (e.g., any fuels stored on-board the train) may each be any of a number of different fuel types. For example, the types of fuel may include hydrocarbon-based fuels, such as diesel, natural gas, methanol, ethanol, other alcohols, dimethyl ether (DME), other ethers, biodiesel, HDRD, syn-gas, etc. Alternatively, the fuels may be non-hydrocarbon-emitting fuels, such as hydrogen, ammonia, etc. The fuels listed above are non-limiting examples of fuels which may be used in the power bank and/or engine, and various other types of fuels are possible. Additionally, each of the stored fuels may be a gaseous or a liquid phase fuel. Thus, when used, the power bank may consume a gaseous fuel or a liquid fuel.

A fuel that is stored on-board in one physical state, e.g., gas or liquid, may be delivered to the power bank in the same state or a different state. For example, LNG and hydrogen each may be stored cryogenically in the liquid phase but may undergo a transition to the gas phase, e.g., at a regasification and/or reformer unit in the fuel tender, prior to use at the power bank. Other fuels, however, may be stored as a liquid and injected as a liquid or stored as a gas and injected as a gas.

The power bank is coupled to an electric power generation system, which includes an alternator/generator 122 and electric traction motors 124. For example, the power bank generates an electrical output that is transmitted via a direct current (DC) bus to power electronics, batteries, hotel loads, and the like, and then for subsequent propagation to a variety of downstream electrical components. The power bank may be electrically coupled to a battery 154. The battery may store the electrical power produced by the power bank. As another example, the power bank may be electrically coupled to the electric traction motors and may provide electrical power to the electric traction motors. As depicted, the electric traction motors are each connected to one of a plurality of wheels 116 to provide tractive power to propel the locomotive. One example locomotive configuration includes one traction motor per wheel. As depicted herein, six pairs of traction motors correspond to each of six pairs of wheels of the locomotive. In other embodiments, it may be one traction motor per axle, or only some axles or wheels may be powered while others simply bear load and/or brake.

As noted above, the locomotive may have one or more turbochargers 126 arranged between the intake passage and the exhaust passage. The turbocharger may increase air charge of ambient air drawn into the intake passage to provide greater charge density during power production and thereby may increase power output and/or operating efficiency. The turbocharger may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger. The wastegate may be opened, for example, to divert the exhaust gas flow away from the turbine. In this manner, the rotating speed of the compressor, and thus the boost provided by the turbocharger to the engine may be regulated.

The locomotive may include an exhaust gas (EG) system 170. The EG system may route exhaust gas via an EG passage 172 and an EG valve 174. A sensor package 174 may be disposed in the EG passage for monitoring a quality or parameter of exhaust gas. By monitoring the exhaust gas it may be possible to sense, and then control, an amount of available oxygen, an amount of available fuel, an amount of present contaminants, pressures and temperatures of the foregoing, and other characteristics as may be useful. The EG valve may be an on/off valve controlled by the locomotive controller, the EG valve may control a variable amount of EG, for example.

The EG system may further include an EG conditioner 176 to condition, for example, the temperature of the exhaust gas before the exhaust gas enters the intake passage of the engine. As depicted in the non-limiting example embodiment of FIG. 2, the EG system is a high-pressure EG system. In other embodiments, the locomotive may additionally or alternatively include a low-pressure EG system, routing EG from a location downstream of the turbocharger to a location upstream of the turbocharger.

The locomotive may include an exhaust gas treatment system coupled in the exhaust passage to reduce regulated emissions. In one example embodiment, the exhaust gas treatment system may include an absorbent/filter 130, for reducing or preventing an amount of poison or undesirable material from circulating through the system; and, a particulate filter 132. The absorbent/filter may capture or oxidize exhaust gas components. The filter can trap particulates, also known as particulate matter.

As shown in FIG. 2, the electric traction motors may receive electrical energy from a fuel cell power module 150 that is a component of the power bank. Each fuel cell power module may include a fuel cell stack that receives fuel (e.g., hydrogen) from one of the fuel reservoirs. The fuel cell power module may receive the second fuel from the second fuel reservoir when the second fuel is hydrogen. The fuel cell power module may instead receive fuel from the first fuel reservoir and/or from the one or more fuel reservoirs of the fuel tender (e.g., of FIG. 3). The power demand on individual fuel cell power modules may be controlled by the controller at an individual level, as detailed herein. In some cases, the fuel cells in a fuel cell stack may be individually controlled.

Electrical energy generated by the fuel cell power module may be transmitted to a traction inverter 152 which may convert the electrical energy for use by the electric traction motors, to a battery for storage, to an air compressor, and/or to a hotel load for the vehicle. For an alternating current (AC) motor vehicle, the traction inverter may convert DC power to AC power. The traction inverter may be electrically coupled to other electrical components of the locomotive that are not shown in FIG. 2 for brevity. For example, the traction inverter may convert electrical electricity delivered to and from an electrical storage device, such as the battery. In one example, one or more bypass circuits 138 may be connected to the fuel cell power modules between the fuel cell power modules and the traction inverter and/or batteries. These bypass circuits may individually control when the fuel cell power modules are connected with the inverter and/or batteries. In one mode of operation, the bypass circuit can open a switch to stop conduction of electrical energy from the fuel cell power module to the inverter or batteries. Optionally, the bypass circuit can close a switch to direct conduction of the electrical energy away from the inverter or batteries to another location, such as an auxiliary load, a resistive grid for dissipation of the energy as heat, or the like. In another mode of operation, the bypass circuit can actuate a switch (e.g., close or open the switch) to direct the electrical energy from the fuel cell power module to the inverter and/or batteries. The bypass circuits can be controlled by one or more of the controllers described herein to selectively couple more or fewer of the fuel cells to achieve a requested or designated voltage or power output level.

In some examples, the power bank and the battery may be included in a hybrid system where the electric traction motors may be powered by both the power bank and the battery. The battery may be used to both energize the electric traction motors and to store energy captured during, for example, regenerative braking operations or energy that is supplied via a catenary/third rail while moving, or from a charger while stationary. In examples where the hybrid system may have the fuel cell power module power for vehicle propulsion for each of the power banks, the battery and/or a catenary/third rail system also can be used as power banks, and this can be done individually or in various combinations. For example, the hybrid system may be operated in a catenary-only mode, a battery-only mode, a fuel cell-only mode, or obtain power from a power-split operation mode including combined power delivery from the power bank and battery, from the catenary and fuel cell, etc.

Although the locomotive is illustrated in FIG. 2 equipped with more than one power source for propulsion, e.g., for energizing the electric traction motors, including the fuel cell module, and battery, other examples may include fewer power devices than depicted thereat. For example, a diesel engine may be located at a first locomotive of the consist, the power bank with a fuel cell module at a second locomotive, and the battery at a third locomotive. In other examples, the first locomotive may include both the engine and battery, or both the fuel cell module and the battery, or both the fuel cell module and the battery. Each locomotive of the consist may therefore include a different or same configuration of power devices as the other locomotives of the consist.

An operator may signal the power bank a desired power output level via a throttle 142 to indicate power needs (and indirectly torque, speed, etc.). In this embodiment, the throttle is depicted as a notch throttle. However, any suitable throttle is within the scope of this disclosure. Each notch of the notch throttle may correspond to a discrete power level. The power level indicates an amount of load, or engine output, placed on the locomotive and controls the speed at which the locomotive will travel. Although eight notch settings are depicted in the example embodiment of FIG. 2, in other embodiments, the throttle notch may have more than eight notches or less than eight notches, as well as notches for idle and dynamic brake modes, notches between integer values, etc. In some embodiments, the notch setting may be selected by a human operator of the locomotive. In other embodiments, the vehicle group controller may determine a trip plan (e.g., a trip plan may be generated using trip optimization software, such as Trip Optimizer system (available from Wabtec Corporation) and/or a load distribution plan may be generated using consist optimization software such as Consist Manager (available from Wabtec Corporation) including notch settings based on engine and/or locomotive operating conditions, as will be explained in more detail below.

The power bank controller may control various components related to the locomotive. As an example, various components of the locomotive may be coupled to the power bank controller via a communication channel or data bus. In one example, the power bank controller and the vehicle group controller each include a computer control system. The power bank controller and the vehicle group controller may additionally or alternatively include a memory holding non-transitory computer readable storage media (not shown) including code for enabling on-board monitoring and control of locomotive operation. Examples of this memory may include computer hard drives, servers, removable computer disks, or the like. The code can include object code, source code, or machine code, that can be software operating on the controller(s) to direct and control operation of the controller(s). The power bank controller may be coupled to the vehicle group controller, for example, via a digital communication channel or data bus.

Both the power bank controller and the vehicle group controller may receive information from a plurality of sensors and may send control signals to a plurality of actuators. The power bank controller, while overseeing control and management of the locomotive, may receive signals from a variety of power sensors 151, as further elaborated herein, to determine operating parameters and operating conditions, and correspondingly adjust various actuators 153 to control operation of the locomotive. For example, the power bank controller may receive signals from various sensors including, but not limited to, electrical resistance, voltage, load, intake manifold air pressure, boost pressure, exhaust pressure, ambient pressure, ambient temperature, exhaust temperature, engine temperature, exhaust oxygen levels, intake oxygen levels, etc. Correspondingly, the power bank controller may control the locomotive by sending commands to various components such as the electric traction motors, the alternator/generator, cylinder valves, fuel pumps and valves, the throttle, etc. Other actuators may be coupled to various locations in the locomotive.

The vehicle group controller may include a communication portion operably coupled to a control signal portion. The communication portion may receive signals from locomotive sensors including locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, etc. Various other sensors may be coupled to various locations in the locomotive. The control signal portion may generate control signals to trigger various locomotive actuators. Example locomotive actuators may include air brakes, brake air compressor, traction motors, etc. Other actuators may be coupled to various locations in the locomotive. The vehicle group controller may receive inputs from the various locomotive sensors, process the data, and trigger the locomotive actuators in response to the processed input data based on instruction or code programmed therein corresponding to one or more routines. Further, the vehicle group controller may receive engine data (as determined by the various engine sensors, such as an engine coolant temperature sensor) from the power bank controller, process the engine data, determine engine actuator settings, and transfer (e.g., download) instructions or code for triggering the engine actuators based on routines performed by the vehicle group controller back to the power bank controller.

For example, the vehicle group controller may determine a trip plan to distribute load amongst all locomotives in the train, based on operating conditions. In some conditions, the vehicle group controller may distribute the load unequally, that is, some locomotives may be operated at a higher power setting, or higher notch throttle setting, than other locomotives. The load distribution may be based on a plurality of factors, such as fuel economy, coupling forces, tunneling operating, grade, etc. In one example, the load distribution may be adapted based on a distribution of the locomotive consist, e.g., a positioning of each of the locomotives of the locomotive consist, across the train. For example, at least one locomotive may be positioned at an end of the train and at least one locomotive may be positioned at a front of the train. The locomotive at the end of the train may push propulsion of the train and the locomotive at the front of the train may pull the train, particularly during uphill navigation. As such, a greater load may be placed on the pushing locomotive at the end of the train.

Furthermore, in some examples, the vehicle group controller may assess fuel consumption by power banks/power systems of the vehicle group (collectively, e.g., one or more of an engine system, a battery system, and a fuel cell system) to select a trip plan. The trip plan may direct the vehicle group controller to control the vehicle group to follow a route that reduces fuel consumption by the vehicle group (relative to manual control, movement according to an upper speed limit of the route, etc.). Additionally, in instances where the engine system includes a multi-fuel engine, the trip plan may be selected to enable specific fuels to be preferentially combusted, thereby increasing fuel efficiency and/or decreasing emissions.

Figure 3:
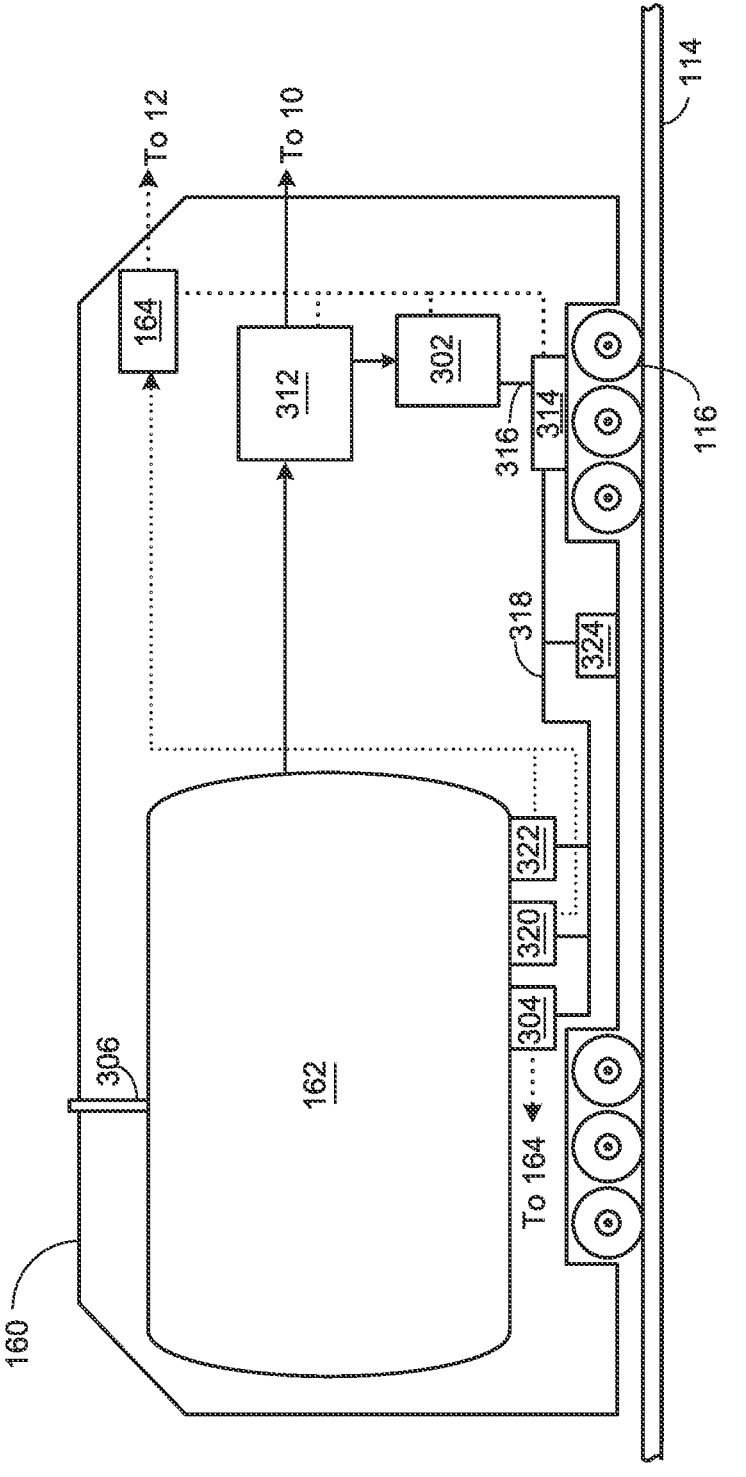
FIG. 3 shows an example embodiment of a fuel tender which may be included in the train of FIG. 1.

Turning now to FIG. 3, an embodiment of the fuel tender 160 of FIG. 1 is shown. As described above, the fuel tender includes the fuel storage reservoir, the fuel tender controller, and a power bank 302. The fuel tender may further include a conditioning unit 304, which may be a device for controlling a temperature and pressure within the fuel storage reservoir. For example, when liquified hydrogen or LNG is stored in the fuel storage reservoir, the conditioning unit may include a cryogenic device, a vapor layer bleed off device, a pressure safety release device, a leak detection device, and the like. The fuel storage reservoir sizes and operations may be selected based on end use parameters, may be removable from the fuel tender, and may be receive fuel from an external refueling station via port 306.

The fuel storage reservoir may supply fuel to a fuel modification unit 312. The fuel modification unit may adjust a characteristic of the fuel. For example, the fuel may be converted from a liquid phase to a gas phase at the fuel modification unit, i.e., a regassification device. As another example, the fuel modification unit may be a pump or regulator to adjust a delivery pressure of the fuel when the fuel is stored and compressed in the gas phase. In other examples, where fuel modification is not demanded, the fuel modification unit may be omitted. The fuel may be delivered from the fuel modification unit to engines and power banks of the locomotives.

By supplying fuel from the fuel storage reservoir to a power bank, the fuel may be converted to electrical power. In another non-limiting embodiment, the fuel tender power bank may generate electricity for use by one or more components on-board the fuel tender and/or on-board the locomotives. In one example, as depicted in FIG. 3, the fuel tender power bank may transmit electricity to a power conversion unit 314 via a DC bus 316. The power conversion unit may convert the electrical energy from DC to AC, which is delivered via an AC electrical bus 318 to a variety of downstream electrical components in the fuel tender. Such components may include, but are not limited to a communication device (not shown), the fuel modification unit, the fuel tender controller, a pressure sensor 320, a temperature sensor 322, batteries 324, various valves, flow meters, compressors, blowers, radiators, lights, on-board monitoring systems, displays, climate controls, and the like, some of which are not illustrated in FIG. 3 for brevity. Additionally, electrical energy from the electrical bus may be provided to one or more components of the locomotives.

Based on a downstream electrical component receiving DC power from the electrical bus, one or more inverters may invert the electrical power from the electrical bus prior to supplying AC electrical power to the downstream component. In one example, a single inverter may supply AC electrical power from a DC electrical bus to a plurality of components. In another non-limiting embodiment, each of a plurality of distinct inverters may supply electrical power to a distinct component.

The controller on-board the fuel tender may control various components on-board the fuel tender, such as the fuel modification unit, the fuel tender power bank, the power conversion unit, the first unit, control valves, and/or other components on-board the fuel tender, by sending commands to such components. The controller may also monitor fuel tender operating parameters in active operation, idle and shutdown states. Such parameters may include, but are not limited to, the pressure and temperature of the fuel storage reservoir, a pressure and temperature of the fuel modification unit, the fuel tender power bank temperature, pressure, and load, compressor pressure, heating fluid temperature and pressure, ambient air temperature, and the like. In one example, the fuel tender controller may execute code to auto-stop, auto-start, operate and/or tune the power bank and the fuel modification unit in response to one or more control system routines. The computer readable storage media may execute code on processors, provided for that purpose, to transmit to and receive communications from communication devices on-board the locomotives. The processors can be hardware circuitry that includes and/or is connected with one or more integrated circuits, microprocessors, field programmable gate arrays, or the like.

The fuel tender depicted in FIG. 3 is a non-limiting example of how the fuel tender may be configured. In other examples, the fuel tender may include additional or alternative components. As an example, the fuel tender may further include one or more additional sensors, flow meters, control valves, various other devices and mechanisms for controlling fuel delivery and storage conditions, etc.

As described above, a transportation system, such as a train, may include multiple power banks for propulsion. The power banks may have one or more of an engine system, a battery system, and a fuel cell system, installed at various locations of a consist of the train. Each power bank may include one or more power device, such as an engine, a battery, and at least one fuel cell (i.e., fuel cell module), respectively. When power is regularly drawn from the power system at maximum power capacity, such as during operation at high loads, a power system may be used under conditions outside of its optimal operating range. As one example, frequent cycling of a battery between full charge and charge depletion at high charge/discharge rates may accelerate loss of cycling capacity. Operation of a fuel cell system at maximum power generation may degrade a performance of a fuel cell module at a faster rate. As a result, a useful life of such power systems may be curtailed, leading to more frequent maintenance and replacement.

In one example, the issues described above may be at least partially addressed by strategically operating the power systems in a coordinated manner to enable each power system to be operated according to a high efficiency output from the power system. The high efficiency output may represent operation of the power system source at load levels facilitating power provision with minimal losses, preservation, and prolonging of a performance of the power system, as well as enabling a power demand to be met while minimizing release of carbon-based emissions. Furthermore, in some instances, a determined trip plan, as stored at a controller such as the vehicle group controller depicted in FIG. 2, may be used to optimize operation of the power systems while accounting for the individual operating characteristics of the power systems.

Figure 4:
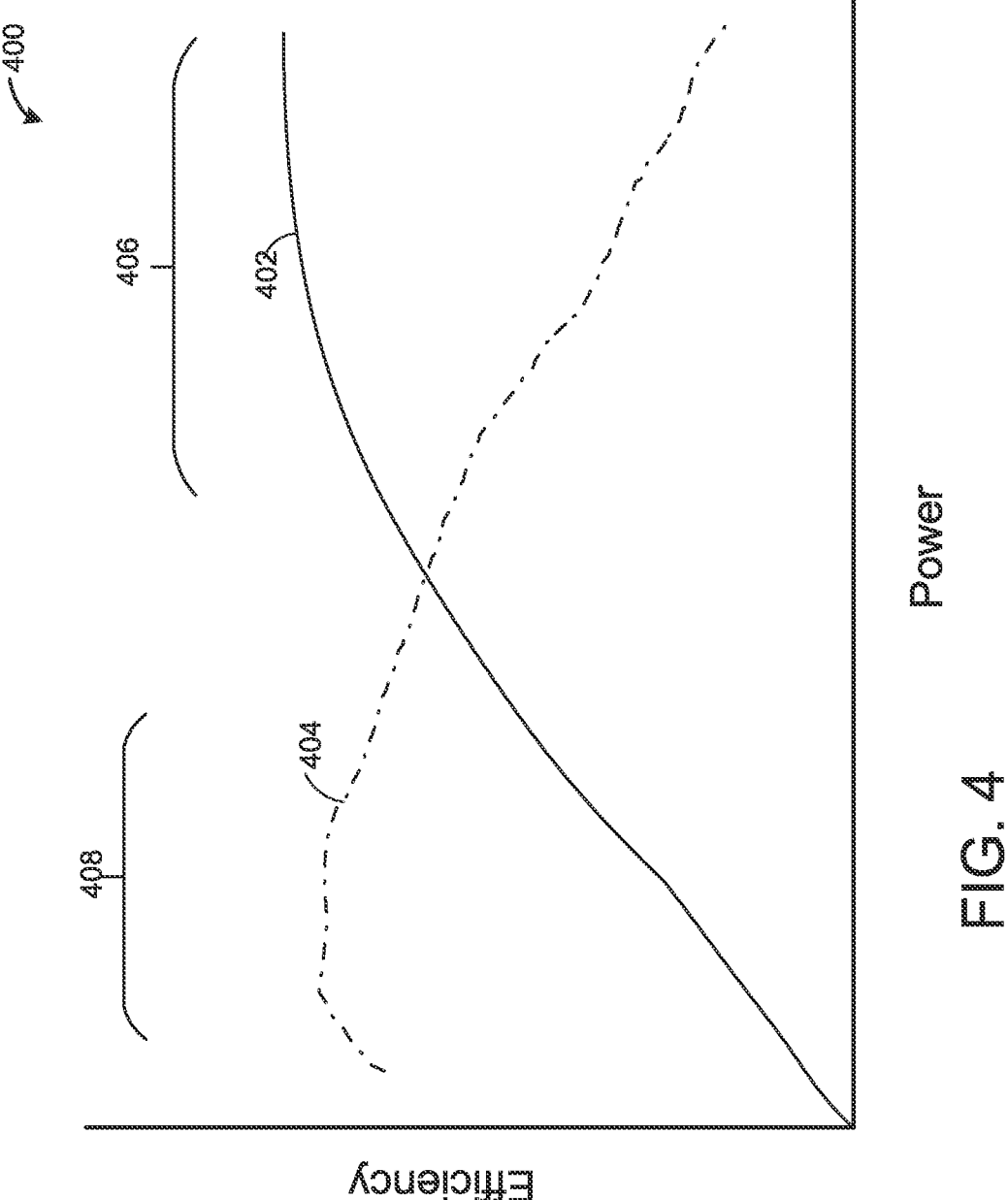
FIG. 4 shows a first graph plotting a relationship between efficiency and power output for an engine and a fuel cell, which may each be included in the locomotive consist of FIG. 1.

An efficiency of the power systems may demonstrate different dependencies on load. For example, an amount of power provided by a battery may depend on a discharge rate of the battery, and therefore does not exhibit variations in efficiency according to power. A battery's life may be affected by the depth, rate of discharge, and frequency of the charge and discharge of the battery. In contrast, operation both of a fuel cell and an engine at their respective maximum efficiencies may correspond to specific and different power output ranges. Efficiencies of an engine and a fuel cell is shown in FIG. 4 (and the fuel cell again in FIG. 10A) in a graph 400 depicting efficiency (e.g., percent efficiency) relative to power output. Efficiency increases upward along the y-axis and power output increases to the right along the x-axis.

Efficiency of the respective power system may exemplify operation of the power system with minimal losses (e.g., electrical and/or mechanical). The graph includes a first plot 402, representing an efficiency curve of an engine, e.g., an internal combustion engine, and a second plot 404, representing an efficiency curve of a fuel cell. A high efficiency range, e.g., efficiencies above a first threshold efficiency such as 40%, of the engine relative to power output is indicated by region 406, and a high efficiency range of the fuel cell, e.g., efficiencies above a second threshold efficiency such as above 50%, relative to load level is indicated by region 408. The high efficiency range of the engine may correspond to a power output range of about 70%-100% of a rated power of the engine and the high efficiency range of the fuel cell may correspond to a power output range of about 20%-40% of a rated power of the fuel cell.

As shown in the graph, the high efficiency range of the engine occurs at high power output while the high efficiency range of the fuel cell occurs at low power output, e.g., lower than the high efficiency range of the engine. As such, each of the battery and the fuel cell may be preferentially operated at their respective high efficiency ranges when allowable based on an overall power demand for operation of a train. Operation of the fuel cell at the high efficiency range (e.g., low-mid power output/load) may extend a life of the fuel cell. If present in a consist, a battery may be used to provide supplementary power when a combined power output resulting from high efficiency operation of the fuel cell and the battery falls short of the overall power demand.

Figure 5:
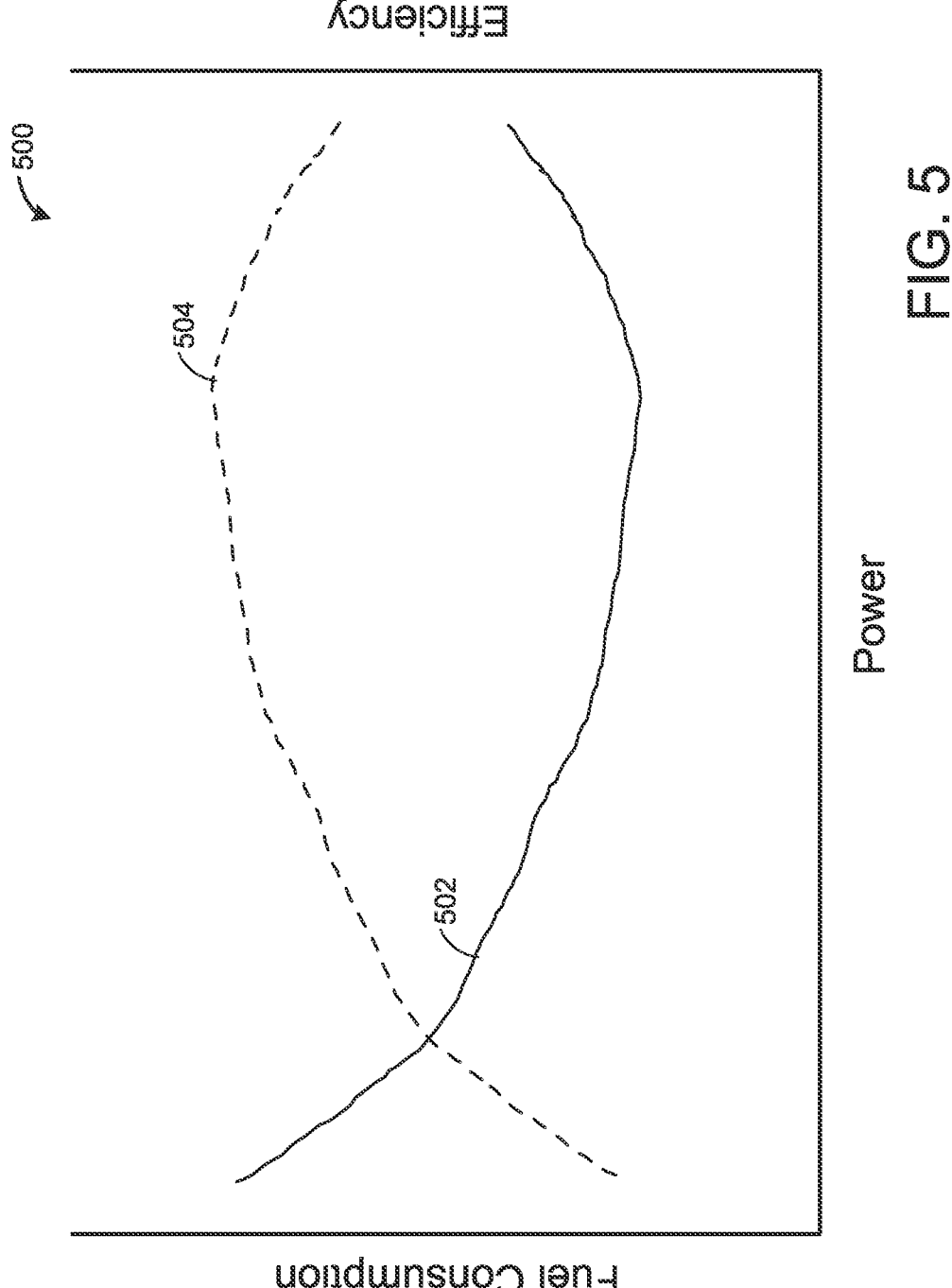
FIG. 5 shows a second graph plotting a relationship between fuel consumption, efficiency, and power output of the engine.

High efficiency operation of the engine at high power output also corresponds to increased fuel efficiency of the engine. As shown in FIG. 5, a graph 500 depicts a first plot 502 of fuel consumption relative to power output for the engine and a second plot 504 of engine efficiency, e.g., similar to the first plot 402 of FIG. 4. Fuel consumption at the engine increases upwards along the y-axis and power output increases to the right along the x-axis. The second plot 504 shows engine efficiency peaking when fuel consumption is lowest. When fuel consumption is lowered, emissions resulting from combustion of fuel may also be reduced. Thus, if the engine burns carbon-based fuels, carbon-based emissions are decreased and, as such, operation of the engine at the high efficiency range is desirable.

For either of the engine and the fuel cell, operation at different loads may be requested based on a notch setting of a throttle, as described herein. As the notch setting is increased, higher power output is demanded from power systems of the consist where power outputs of each of the power systems may be varied according to the demand. For the battery, as described above, the power output is set by the discharge rate of the battery. Without constraining the discharge (and charging) rate of the battery, high power demands may lead to increases in the discharge rate and frequency at which the battery is charged and discharged. Faster discharge rates, such as greater than about 1 C, and increased cycling of the battery may accelerate loss of capacity and degrade battery performance.

In one embodiment, the power demand, as indicated based on the notch setting, may be divided evenly amongst the power systems by the controller(s). For example, when the consist includes the engine, the battery, and the fuel cell and the overall vehicle group power demand is 9000 hp, each of the power systems may contribute a power output providing 3000 hp per system, for a total of 9000 hp. The even division of the power demand may result in one of the power providers operating below its maximum efficiency range, operating above its maximum efficiency range, and/or discharging and/or cycling at a fast rate. In addition to reduced operating efficiencies of the engine and fuel cell, degradation of the fuel cell and the battery may be expedited, fuel efficiency may be reduced, and carbon-based emissions may be increased.

In an alternate embodiment, as described herein, power output from each of the power systems may be strategically coordinated to operate the engine and the fuel cell within their respective high efficiency ranges as well as reducing cycling of the battery and maintaining the battery discharge rate below a threshold discharge rate. For example, an imposed load (e.g., a power demand) may be unevenly distributed across the power systems according to their respective optimal operating settings. For a high power demand/high load, such as above 1500 hp when the locomotive has a power rating of 4500 hp and includes a large engine and smaller, supporting power devices, a large proportion (e.g., more than a third) of the load may be directed to the engine, thus operating the engine within its high efficiency range, as shown in FIG. 4. A smaller proportion of the load may be directed to the supporting power devices, e.g., the fuel cell, allowing the fuel cell to operate within its high efficiency range. If the power output provided by high efficiency operation of the fuel cell does not satisfy the power demand, supplemental power may be drawn from another supporting power device, e.g., the battery, which may allow the discharge rate to remain below the threshold discharge rate.

A division of power amongst the power devices in response to a high demand for power may be controlled or varied by the power bank controller depending on a configuration of the power systems onboard the locomotive. As described above, the engine may receive a larger proportion of the load when the engine is the largest power device onboard the locomotive. In other examples, however, a primary power device, e.g., the power device used predominantly for a specific locomotive power configuration, may not receive a largest proportion of the load and a remaining, unmet portion of the power demand may be addressed by the other, supporting power devices. The largest power device may be the fuel cell, in a fuel cell locomotive, that includes the engine for support and also draw power from the battery for supplemental power. The largest proportion of the load may be directed to the engine upon fulfilling a target power output from the fuel cell despite a primary role of the fuel cell. As another example, the locomotive may be a battery locomotive where the battery may have a high power rating, e.g., relative to an engine located on another locomotive of the consist, and a large proportion of the power demand may be met by the battery with support from power devices on other locomotives.

At lower power demands/loads, e.g., loads lower than 1500 hp, as an example, operation of the fuel cell at its optimal efficiency range may be prioritized by the power bank controller. Power delivered from the fuel cell may be supplemented by power from one or more of the engine and the battery while maintaining operating parameters of each of the engine and the battery within target settings. For example, if the engine is a multi-fuel engine configured to combust a primary, carbon-based fuel and a secondary, non-carbon fuel, a target setting for the multi-fuel engine may include maintaining a high substitution rate (e.g., substitution of the secondary fuel for the primary fuel) of a combusted fuel mixture. A target setting for the battery may be determined by the discharge rate, such as maintaining the discharge below 1 C. A magnitude of the discharge rate may be selected based on the power shortfall addressed by the battery, given that the battery can be discharged at a rate below the threshold discharge rate. Other conditions of the power systems, such as an age, history of cycling frequency of the battery, anticipated availability of charging events (e.g., according to a trip plan), and a duty cycle, age, maximum power rating, expected availability of charging stations (e.g., according to the trip plan) of the fuel cell, may affect distribution of the power demand amongst the power systems.

In some examples, an engine system of the consist may include more than one engine, each engine located at a different locomotive of the consist. The more than one engine may include a single fuel engine, which may combust one fuel, and the multi-fuel engine, as described above. In one embodiment, the single fuel engine may burn diesel and the multi-fuel engine may burn a fuel mixture, including carbon-based fuels and non-carbon fuels, as described above. When the multi-fuel engine is configured to burn the carbon-based fuel as the primary fuel, and the non-carbon fuel as a secondary fuel, substituting at least a portion of the primary fuel by the secondary fuel may decrease carbon emissions relative to combustion of only the primary fuel. As the substitution ratio, e.g., an amount of the secondary fuel that replaces at least a portion of the primary fuel, increases, carbon emissions may decrease accordingly. Depending on characteristics of the primary fuel and the secondary fuel, such as gravimetric density, volumetric density, phase (e.g., gas vs. liquid), energy density, flame speed, ignition temperature, etc., a power output and combustion efficiency from combustion of the fuel mixture may differ relative to combustion of the single fuel.

For example, when the primary fuel is diesel and the secondary fuel is hydrogen, emission of hydrocarbons may be suppressed by increasing the ratio of power supplied by the fuel cells, or by adjusting the hydrogen consumption rate of a hydrogen internal combustion engine. However, increasing a proportion of hydrogen in a fuel mixture may affect a likelihood of knock. At engine operation under high loads, the higher tendency for knock to occur resulting from combustion of hydrogen may demand a decrease in the substitution ratio. Thus, operation of the engine may be further modulated based on maximizing the substitution ratio without causing auto-ignition and knock.

Figure 6:
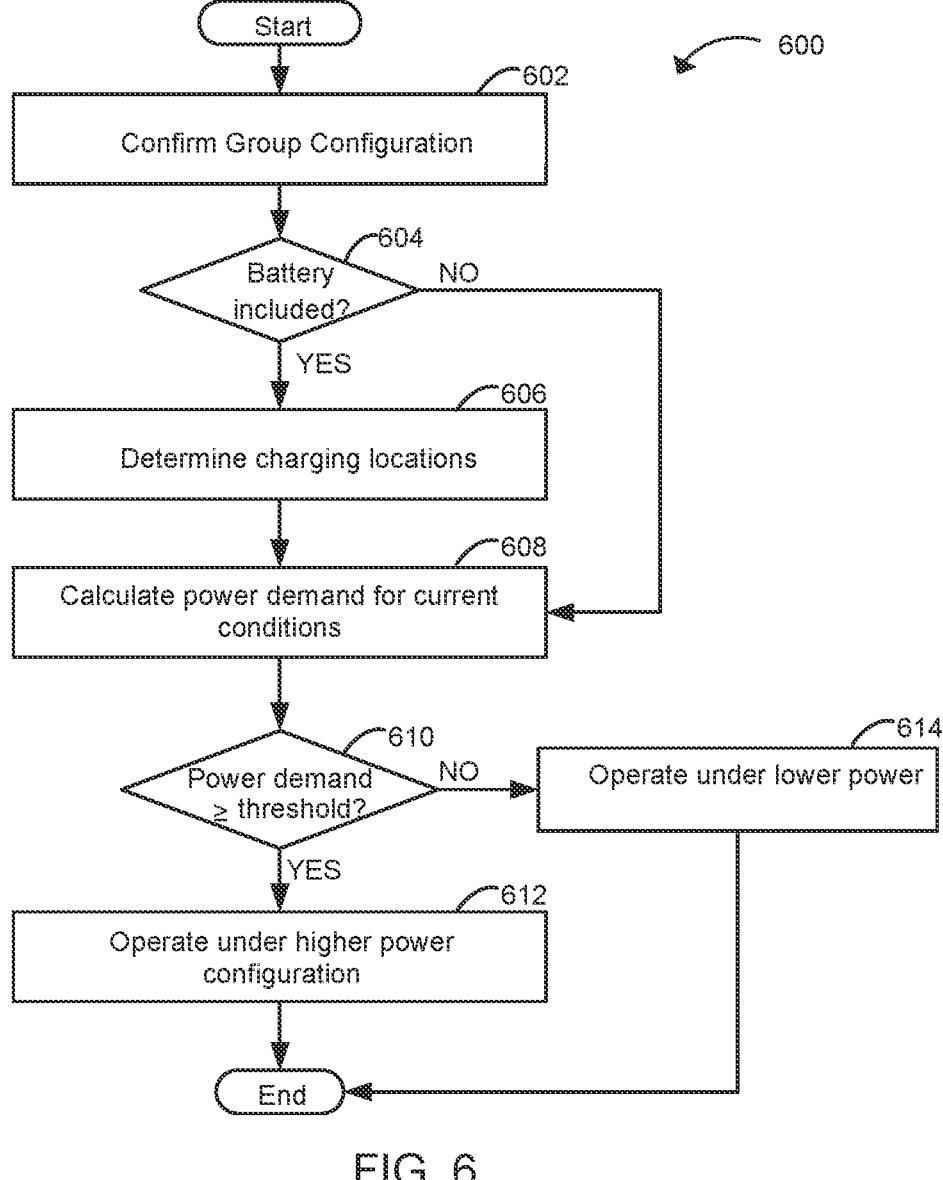
FIG. 6 shows an example of a high level method for an energy management strategy for the locomotive consist.
Figure 7:
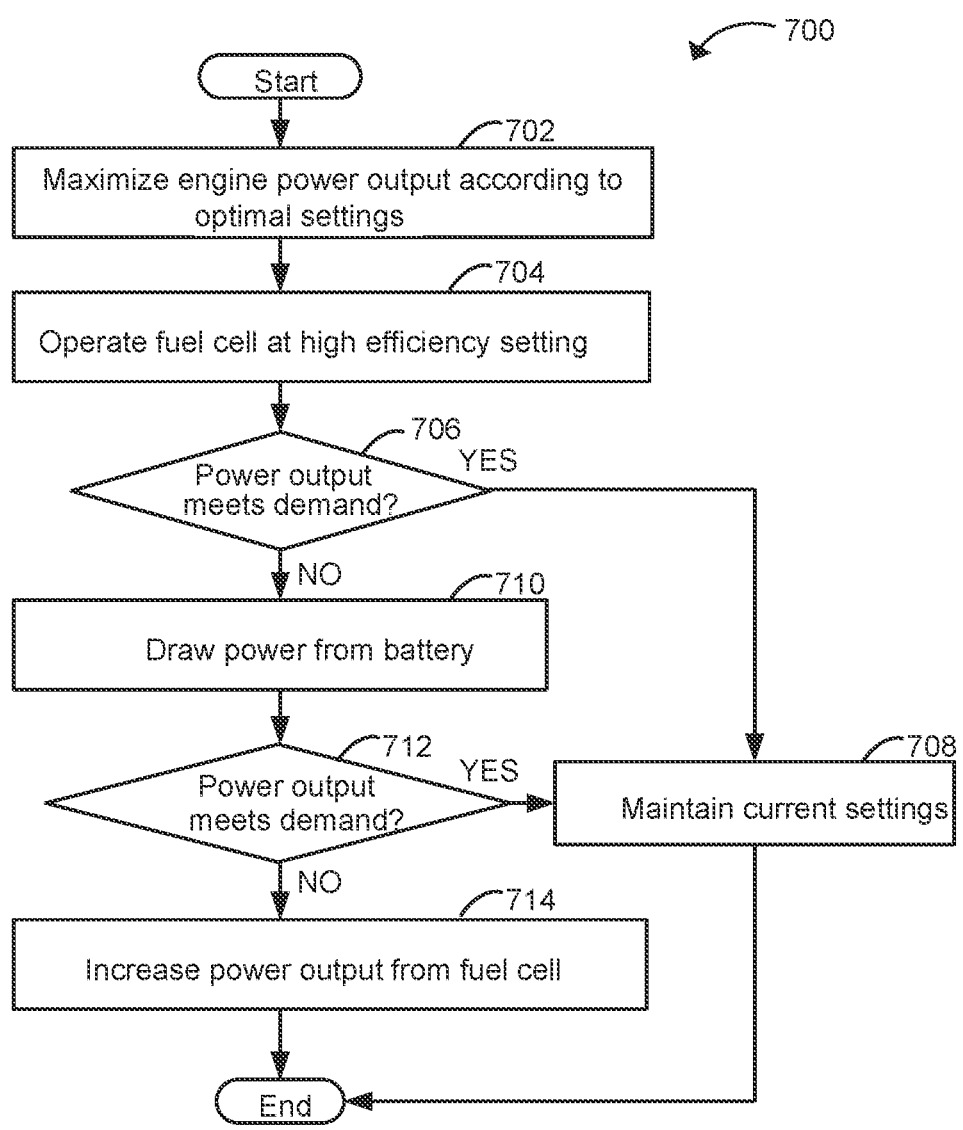
FIG. 7 shows an example of a method for powering the consist according to a higher power configuration.
Figure 8:
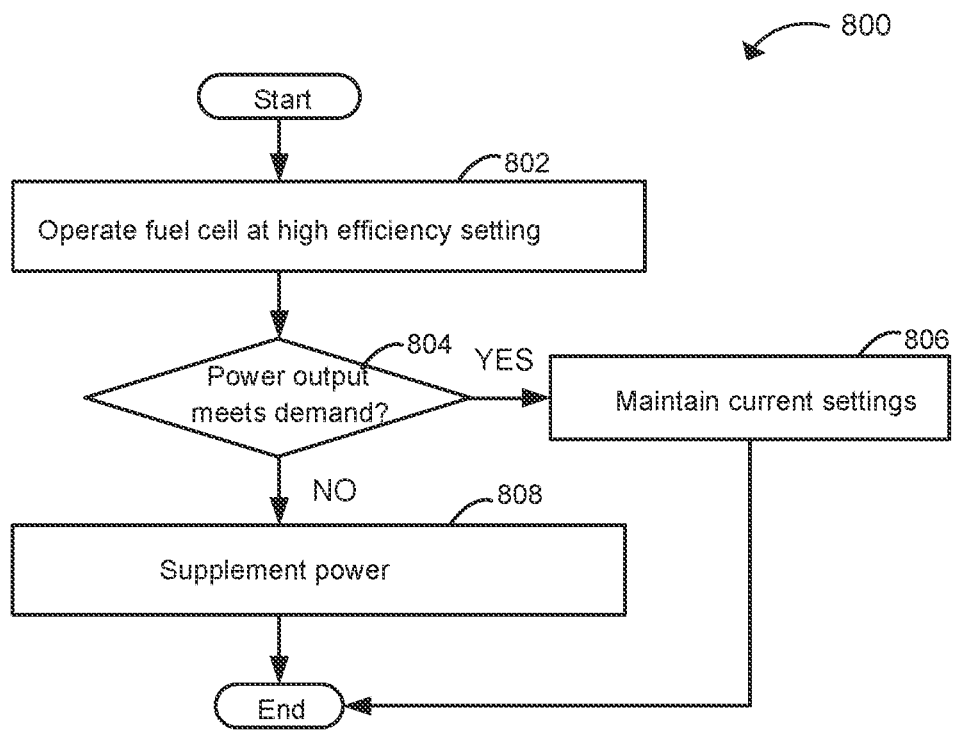
FIG. 8 shows an example of a method for powering the consist according to a lower power configuration.

Methods for energy management in a vehicle group are depicted in FIGS. 6-8. The vehicle group may be powered by more than one power system type, including the engine system, with one or more engines, the battery system, with one or more batteries, and the fuel cell system, with one or more fuel cells. The one or more engines of the engine system may include the multi-fuel engine that combusts diesel as the primary fuel and hydrogen as the secondary fuel. In some embodiments, the engine system may also include the single fuel engine. Instructions for carrying out the methods may be executed by a controller having a plurality of processors based on instructions stored on a memory of the controller and in conjunction with signals received from sensors of the engine system. The controller may employ engine actuators of the engine system to adjust engine operation, according to the methods described below. A trip plan may be stored at the controller, the trip plan providing a travel route to be navigated by the train and used to adjust distribution of a power demand amongst the power systems.

Turning first to FIG. 6, a high-level flow chart of a method 600 for managing the power systems of vehicles in the vehicle group is depicted. At step 602, the method includes confirming or determining a configuration of the vehicle group with respect to the power systems. For example, the controller may confirm a presence of each of the engine system, the fuel cell system, and the battery system, and further determine a number and location of engines, fuel cells, and batteries that are on-board the vehicle group. The controller may identify the type of engine(s) present, e.g., the single fuel engine and/or the multi-fuel engine, and the fuel cell size and capability. Conditions and settings of the power systems may be monitored, such as diesel supply levels, hydrogen supply levels, battery state-of-charge (SOC), power outputs corresponding to operation at high efficiency for the engine and the fuel cell, maximum power output of each of the power systems, etc. The controller may also refer to the trip plan to estimate a timing of battery recharging, refueling of fuel reservoirs, and a timing/duration of periods of high power operation versus lower power operation.

At step 604, the method includes confirming if the battery system is included in the vehicle group. For example, the controller may receive signals from at least one battery sensor (e.g., a battery current sensor) coupled to the battery system when the battery system is present. If the battery system is not included, the method continues to step 608 to calculate, determine or obtain a power demand based on current conditions, as described further below. If the battery system is present, the method proceeds to step 606 to determine optimal locations along the travel route provided by the trip plan. For example, sections of the travel route where the battery may be charged by harvesting excess power produced by the engine, or by dynamic braking, in addition to locations of charging stations, may be predicted and used to estimate optimal usage of the battery to minimize cycling of the battery between fully charged and fully depleted.

At step 608, the method includes estimating a power demand for operating the train, as powered by the vehicle group, based on current operating conditions. For example, the power demand may depend on route conditions, such as uphill versus downhill navigation, weather conditions, and an estimation of a tractive effort to maintain a target travel speed of the train under the operating conditions.

At step 610, the method includes determining if the power demand is greater than a determined threshold value. The threshold value may be a boundary value between high power operation and lower power operation of the vehicle group. For example, the threshold may be a power demand level above which an efficiency of fuel cell operation is lower than an efficiency of engine operation. In one embodiment, the threshold value may be 70% of a maximum power output of the power systems, e.g., an overall power rating, of the vehicle group. With each fuel cell module in the power bank, the power demand may be compared against the individual output levels of the fuel cell modules as a tier of observation. If one power bank is tasked with providing, for example, 1000 units of power and each of the 10 fuel cell modules can provide a maximum of 200 units of power (with optimum efficiency of 90 to 130 units, then the method identifies, calculates, or determines how many fuel cell modules to activate, and at what power out level to run them. For example, running all 10 fuel cell modules at 100 units output, rather than 5 fuel cell modules at 200 units with rest being idle, allows for those fuel cells that are activated to operate at a relatively higher level of efficiency.

If the power demand is equal to or greater than the threshold value, the method continues to step 612 to operate fewer fuel cell modules at higher individual out to achieve a higher power configuration as shown in FIG. 7. If the power demand is less than the threshold, the method proceeds to step 614 to operate more fuel cell modules at lower outputs to achieve a lower power configuration, as shown at FIG. 8. The method then ends.

Turning now to FIG. 7, a method 700 for operating the power systems of the vehicle group at a higher power configuration is depicted. The method may continue from step 612 of FIG. 6. At step 702, the method includes increasing a power output of the engine (or engines) according to optimal settings for engine operation. The optimal settings may include operating the engine at a high efficiency point and high fuel efficiency. For the single fuel engine, the controller may refer to a lookup table or map providing a relationship between efficiency and power output to determine the maximum efficiency range of the single fuel engine with respect to power output. For the multi-fuel engine, the controller may rely on the relationship between efficiency and power output and additionally refer to a lookup table providing optimized substitution ratios according to power output. A balance between maximizing efficiency, minimizing fuel consumption, and maximizing the substitution ratio may be determined. In some instances, high loads at the engine may demand low substitution ratios to suppress knock. As such, maximizing substitution ratio may be omitted and operating the engine based on efficiency and fuel consumption may be prioritized.

At step 704, the method may include operating the fuel cell to provide power at a high efficiency point (or range). The high efficiency point (or range) may correspond to a power output of fuel cells having a high efficiency range that is from about 40% to about 60% of a maximum power output of the fuel cell.

At step 706, the method may include confirming if the combined power output from plural fuel cells each operating in the high efficiency range meets the power demand. If the power output meets the power demand, the method continues to step 708 to maintain the current operating settings of the engine and the fuel cell. The method then ends.

If the power output does not meet the power demand, the method proceeds to step 710 to draw power from the battery. A magnitude of the power shortfall may determine a discharge rate of the battery, provided that the discharge rate remains lower than the threshold discharge rate. For example, a larger power shortfall may cause the battery to discharge power at a faster rate than a smaller power shortfall. Furthermore, frequent cycling of the battery between fully charge and fully depleted may expedite battery degradation and decrease capacity. In some instances, when the SOC of the battery decreases to an extent that even briefly drawing power from the battery may lead to full depletion, use of the battery to provide power for propulsion may be denied. In addition, if the battery is anticipated to be discharged at a rate exceeding the threshold discharge rate to meet the power shortfall, usage of the battery may also be denied. As such, at step 712, the method may include confirming if the additional power output from the battery allows the power systems to meet the power demand. Alternatively, additional fuel cells may be activated and operated at the high efficiency range, at least until all the fuel cells are operating. If there is insufficient power output with all the available fuel cells running in the high efficiency range, then the power output of some or all of the fuel cells may be increased beyond the high efficiency range.

If the power output meets the power demand, the method proceeds to step 708 to maintain the current operating settings. The method then ends. If the power output does not meet the power demand, e.g., battery usage is denied based on low SOC or discharge rate exceeding the threshold discharge rate, the method continues to step 714 to increase the power output from one or more fuel cells to more than the high efficiency range. Increasing the power output from the fuel cell may result in operation of one or more fuel cell at decreased efficiency.

Increasing the power output from the fuel cells may be selected over increasing the power output from an engine (if present) when a diesel supply from a fuel reservoir becomes low, provided that the fuel cells are operating in a high efficiency mode. In an alternative embodiment, all the fuel cells (save one) may operate in high efficiency mode and the one fuel cell varies its output to meet the power demand with an efficiency range that differs from the high efficiency fuel cells.

In the contrary, increasing engine power may be selected over increasing fuel cell power output, such as when hydrogen supply levels are low. In instances where the hydrogen supply at the fuel reservoir is low, as described above, engine operating parameters may be adjusted to increase the power output from the engine, despite operating the engine beyond its maximum efficiency range. Furthermore, depletion of the battery may be allowed if a duration of battery discharge is relatively short. The method then ends.

Turning now to FIG. 8, a method 800 for operating the power systems of the vehicle is depicted. The method may continue from step 614 of FIG. 6. At step 802, the method may include operating less than all available fuel cells in their high efficiency range.

At step 804, the method may include confirming if the power output of the fuel cell(s) meets the power demand. If the fuel cell power output meets the power demand, the method proceeds to step 806 to maintain the current operating settings of the fuel cell(s). The method then ends. If the fuel cell power output does not meet the power demand, e.g., the power output falls short of the power demand, the method continues to step 808 to supplement the power provided by the operating fuel cell(s) by sequentially turning on additional fuel cells and ramping them up to a high efficiency operational level. Any excess power generated by the additional fuel cell may be used to charge batteries, operate hotel loads, or can be simply shunted away.

Power may be drawn from the battery to cover the desired power output during a transition while the fuel cell ramps up, and given that the discharge rate remains below the threshold discharge rate and the SOC of the battery is sufficiently high, or is anticipated to remain sufficiently high based on estimations of charging opportunities according to the trip plan, to circumvent charge depletion. The power output from the fuel cell may be supplemented by activating additional fuel cells, up to their high efficiency ranges, operated to provide additional power output. Adding fuel cells may be preferential in some instances if the battery does not allow the power demand to be met or when the battery SOC falls to a level anticipated to lead to depletion before the power demand decreases. In one embodiment, the battery may be used to provide power while the additional fuel cells transient to their high efficiency range. In another embodiment, the battery may be used at operating points that fall within a gap defined by a power request that is slightly more than one fuel cell can provide, but is less than the amount of power provided by an added fuel cell operating at its high efficiency range. The method then ends.

Figure 9:
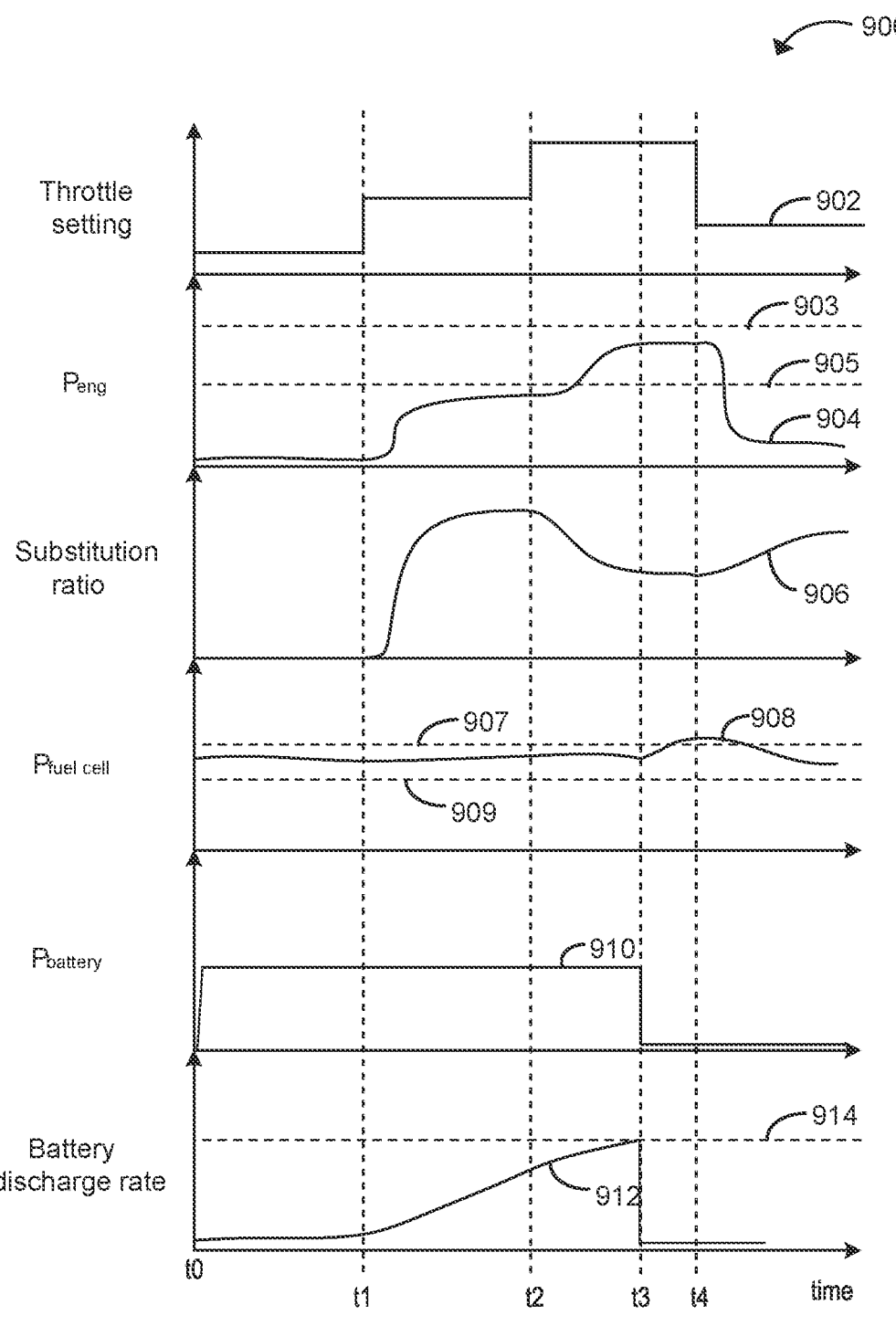
FIG. 9 shows an example of variations in operating parameters of power systems of the locomotive consists according to power demand.

Examples of variations in operating parameters of the power systems of the vehicle group relative to time are shown in FIG. 9 in a graph 900. Time increases to the right along the x-axis. The graph includes a first plot 902, representing a notch setting of a notch throttle, a second plot 904, representing the power output of the multi-fuel engine, a third plot 906, representing the substitution ratio at the multi-fuel engine (e.g., of hydrogen to diesel, for example), a fourth plot 908, representing the power output of the fuel cell, a fifth plot 910, representing the power output of the battery, and a sixth plot 912, representing the discharge rate of the battery. A maximum efficiency range of the engine is indicated by dashed lines 903 and 905, representing an upper boundary and a lower boundary, respectively. The upper boundary may be 90% and the lower boundary may be 60% of a maximum power output of the engine, for example. An optimal (high efficiency) power output range of the fuel cell is indicated by dashed lines 907 and 909, representing an upper boundary and a lower boundary, respectively. The upper boundary may be 60% and the lower boundary may be 40% of a maximum or full power capacity of the fuel cell, for example. A threshold discharge rate of the battery is indicated by dashed line 914, which may be 1 C, as an example. The threshold discharge rate may be a discharge rate above which battery degradation may be increased. Each of the operating parameters increase upwards along the respective y-axis.

At t0, the throttle setting is low, such as notch 1 or 2. The power demand from the power systems is therefore relatively low. The fuel cell power output is moderate and within its optimal power output range, meeting a large proportion of the power demand (e.g., greater than 50%). A remaining proportion of the power demand is sufficiently low to allow the battery to supplement the power output of the fuel cell while maintaining the discharge rate below the threshold discharge rate. The engine power is not demanded and therefore the substitution ratio is not applied.

At reference t1, the notch setting is increased to a mid-setting, such as notch 4 or 5. Operation of the fuel cell is maintained within the optimal power output range and battery operation is maintained. The battery discharge rate rises in response to the higher power demand but remains below the threshold discharge rate. The engine is operated at a mid-load setting, below the maximum efficiency range, to supplement a difference between power provided by the fuel cell/battery combination and the power demand. As engine load increases, the substitution ratio increases to a maximum ratio without incurring knock which decreases a relative amount of diesel combusted and reduces carbon-based emissions.

At t2, the notch setting is increased to a high setting, such as notch 7 or 8. Power delivery from the engine is prioritized and the engine is operated at a high load setting, within its maximum efficiency range. As engine load increases, the substitution ratio is decreased due to a higher likelihood of knock. The power output from each of the fuel cell and the battery is maintained. The discharge rate of the battery increases due to the higher power demand and reaches the threshold discharge rate at t3.

At t3, operation of the battery is terminated. The power output from the fuel cell is increased to compensate for a loss of power upon halting power consumption from the battery, causing the fuel cell to operate above its optimal power output range.

At t4, the notch setting is decreased to a lower setting, such as notch 3. Operation of the fuel cell is maintained and the power output of the fuel cell is decreased, allowing the fuel cell to deliver power within its optimal power output range. The engine is operated at a low load setting, below its maximum efficiency range, to supplement the power output of the fuel cell. The substitution ratio is increased in response to engine operation.

In this way, energy consumption of a vehicle group may be optimized to operate power systems of the vehicle group at high efficiency and, if desired, may balance component degradation. Operation of a fuel cell and an engine according to their respective maximum efficiency ranges, with respect to power output, may prolong a life of the fuel cell and reduce carbon-based emissions from the engine, particularly when the engine is a multi-fuel engine. Furthermore, by strategically relying on battery power when the battery can be discharged below a discharge rate prone to causing faster degradation of the battery, and cycling the battery less frequently, a useful life of the battery may be extended. A performance of each of the power systems may therefore be maintained high while conserving energy.

Figure 10A:
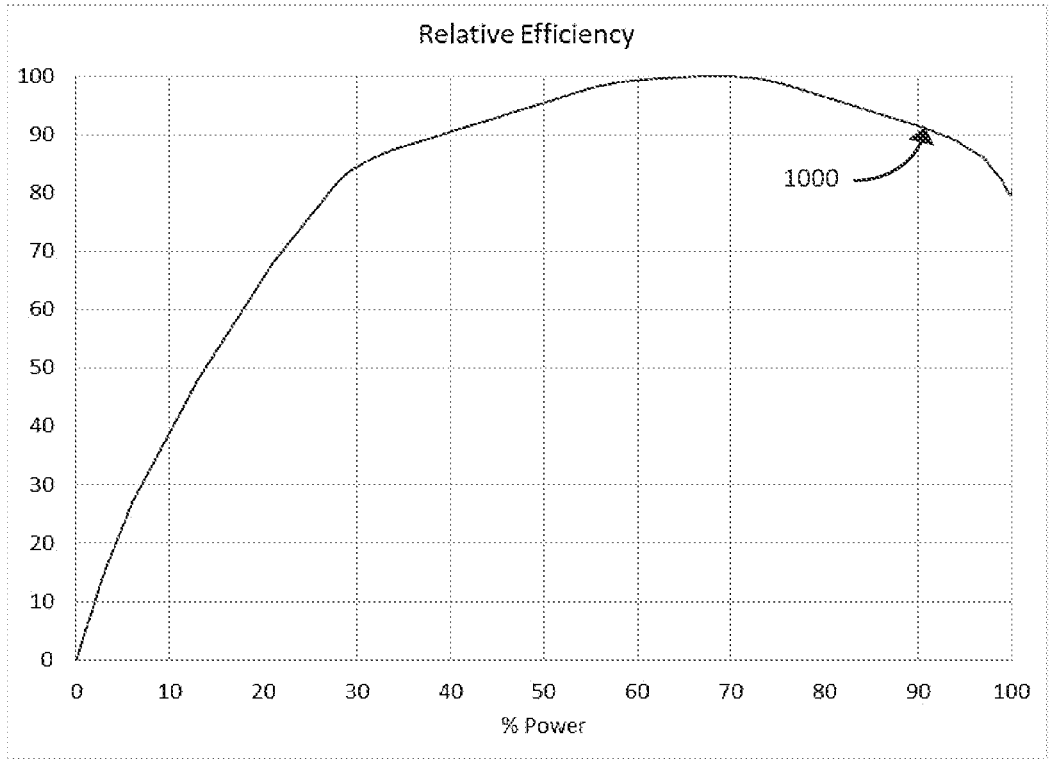
FIG. 10A is a graph of a standard efficiency curve over power output for a fuel cell.
Figure 10B:
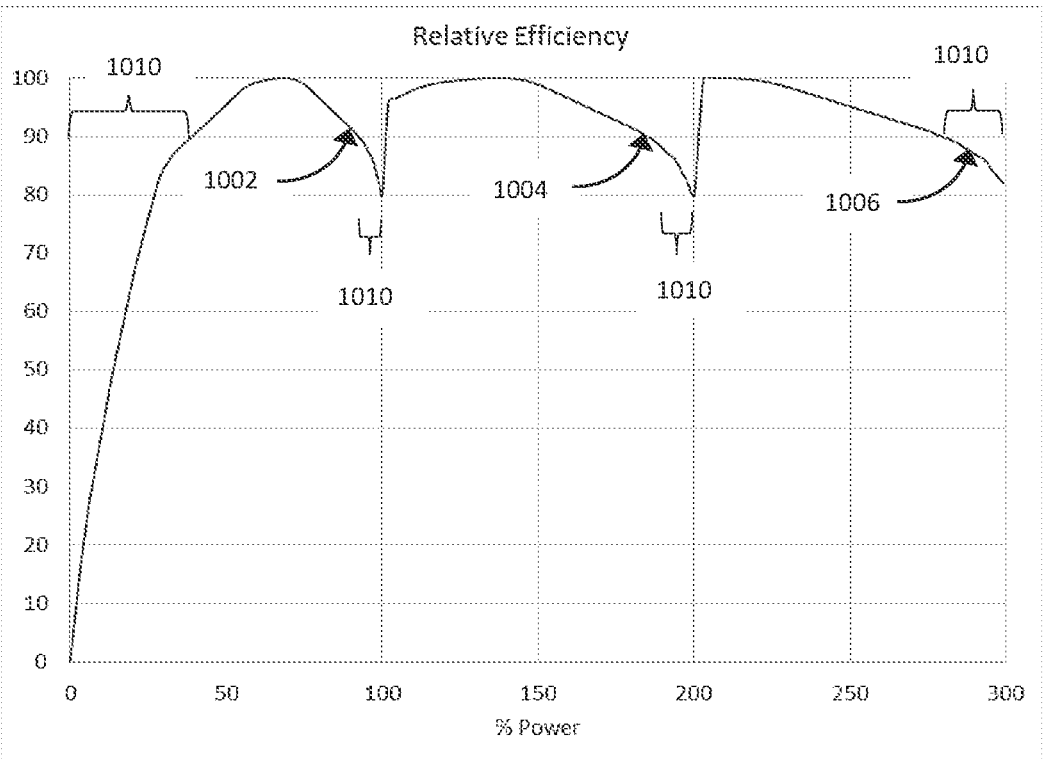
FIG. 10B is a graph of an efficiency curve according to an embodiment of the invention.
Figure 10C:
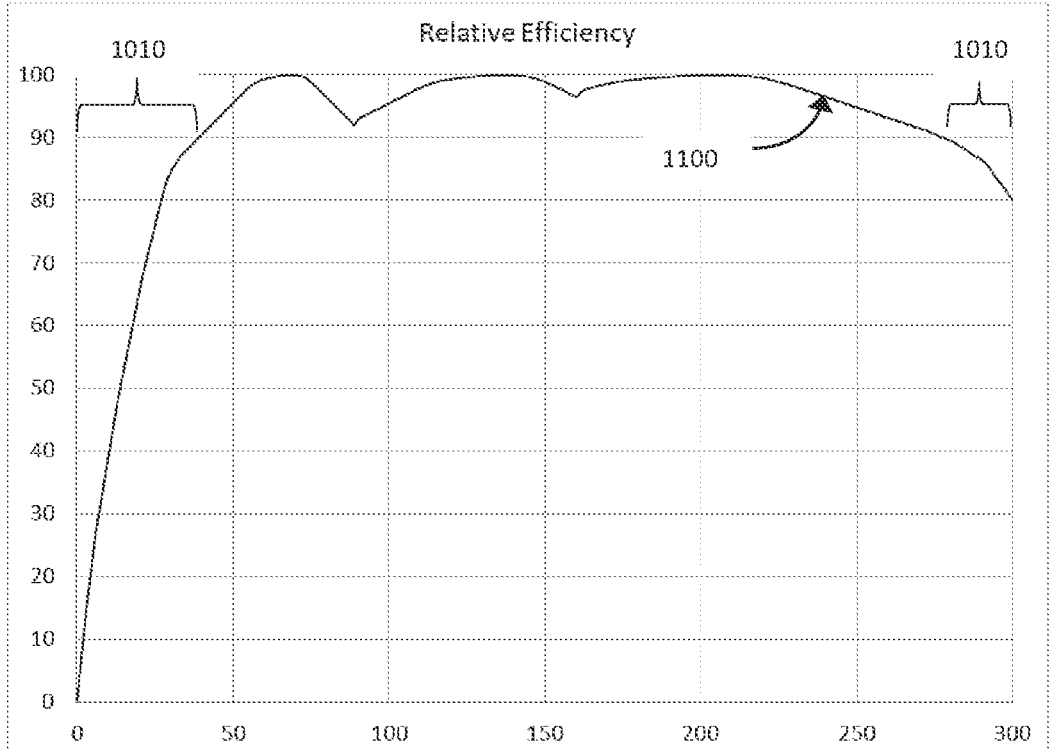
FIG. 10C is a graph of an efficiency curve according to an embodiment of the invention.

FIGS. 10A-10C are graphs of efficiency curves for fuel cells. With reference to FIG. 10A, a single fuel cell efficiency curve 1000 is shown. If high efficiency is (arbitrarily) assigned as being greater than 90%, then the percent power output of this fuel cell is 40 to 90. And, raising the bar for highest efficiency (i.e., 100%) the range for the percent power output is in a range of from about 60 to a little over 70 percent. If a plurality of fuel cells were all tasked with increasing or decreasing their power output in sync with each other, the graph would look similar to this.

FIG. 10B shows the efficiency curve for first 1002, second 1004, and third 1006 fuel cells in one power bank according to an embodiment. Illustrated is the efficiency during a first operating mode according to one embodiment, where high efficiency is determined to be greater than 90 percent. In this operating mode, the percent power output is increased, with the first fuel cell activated and its power output increased until about 80 percent of the overall capability of the first fuel cell. There is a gap 1010, then, between where the first and second fuel cells may operate at high efficiency. The operating mode may treat these islands of high efficiency as optimized power points equivalent to notches (from the railroad setting) rather than an infinitely variable throttle. Alternatively, the operating mode may respond to a request for power in the gap such that power may be drawn from a battery or other source for power requests from about 80 percent to about 100 percent, at which point the second fuel cell is activated. At about 80 percent, a battery may supplement the power output up to about 100 percent.

The first and second supply together provide power output up to about 175 percent. After that another gap exists, and in one operating mode the request for power can be in the form of notches (set points) or where there is a power request in the gap range of about 175 to 200 percent the power supply may be supplemented with power from a battery (rather than increasing the power out of either the first or second fuel cell to above their high efficiency range).

The third fuel cell may be activated upon request for power above 200 percent and can provide power out to at least 275 percent. Above that, the operating mode may shift again and the system may selectively increase the operation of one or more fuel cells, which is what is shown, or may supplement with power from a battery.

FIG. 10C shows a three fuel cell power bank similar to that shown in FIG. 10B, however the operating mode differs in that subsequent fuel cells are activated earlier in response to requests for power. The curve 1100 has few gaps as additional fuel cells are activated, with the gaps appearing only at the beginning and end of the power curve. Similar to the operating modes of FIG. 10B, a battery may supplement the power request, to the extent desired to balance the efficiency loss in those gaps. Otherwise, the operating mode provides for and meets the power request at high efficiency from about 40% power up to about 280% power.

Sequential activation of fuel cells in a power bank, rather than turning all the fuel cells on and balancing the load across them all, allow for more fuel cell operation in a high efficiency state. And, in one embodiment, the power output may be increased over and above the power request with the excess electricity generated at peak efficiency being supplied to the battery.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. Determinations, calculations, and selections may be performed using the principles set out herein. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the outputs from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and proceeded with the word "a" or "an" do not exclude plural of said elements or steps, unless such exclusion is indicated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. As used herein, the terms "about" and "approximately" mean plus or minus five percent of a given value or range unless otherwise indicated.

This written description uses examples to disclose the invention, including the best mode, and also to enable a person of ordinary skill in the relevant art to practice the invention, including making and using devices or systems and performing the incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   coordinating, by a controller, a distribution of a power demand for a power output in response to a power request of a power system comprising a plurality of fuel cells, the power output of each of the fuel cells selected based on a respective efficiency of each of the fuel cells; and
   propelling a vehicle system by the power output of each of the fuel cells.

2. The method of claim 1, further comprising selectively and sequentially coupling the fuel cells responsive to a requested voltage or power output level.

3. The method of claim 1, wherein coordinating the distribution further comprises distributing the power request across one or both of a battery system and an engine system.

4. The method of claim 3, further comprising calculating a change in fuel usage by the fuel cells, the engine, or both the fuel cells and the engine that is based at least in part on operation of a vehicle during a trip; and
   switching an operating mode of the vehicle based at least in part on a determined change in a life of the battery system or the engine, and further based at least in part on the operation of the vehicle compared to the change in the fuel usage of the engine or the fuel cells.

5. The method of claim 3, wherein coordinating the distribution of the power demand includes increasing a portion of the power demand delivered by the engine system while the power demand is higher than a threshold, and wherein the threshold is a power demand level above which an efficiency of the fuel cells is lower than an efficiency of the engine system.

6. The method of claim 3, wherein coordinating the distribution of the power demand includes increasing a portion of the power demand delivered to the fuel cells while the power demand is less than a threshold, and wherein coordinating the distribution of the power demand includes supplementing power from the fuel cells with power from one or more of the engine system or the battery system while the power demand is less than the threshold.

7. The method of claim 1, wherein coordinating the distribution of the power demand includes adjusting the distribution of the power demand based on one or more of:
   estimated power demands at differing locations along a route defined in a determined trip plan of a vehicle, a fuel reservoir level, emissions regulations according to a region of the determined trip plan, a fuel level in a fuel reservoir configured to fuel the fuel cells, or a state-of-charge of one or more batteries of a battery system that is electrically coupled to the fuel cells.

8. The method of claim 1, wherein coordinating the distribution of the power demand includes distributing the power demand amongst the fuel cells of the fuel cells based at least in part on an efficiency of each of the fuel cells.

9. The method of claim 1, wherein the efficiency is set to be greater than 90 percent efficient in converting fuel to electricity.

10. The method of claim 1, wherein each the plurality of fuel cells are selectively and electrically coupled to one another, and further comprising controlling one or more bypass circuits to selectively couple more or fewer of the fuel cells to achieve a requested or designated voltage or power output level.

11. The method of claim 1, further comprising directing a battery to meet the power demand during transients in the power demand that are slower than a transition threshold rate for power changes in a fuel cell.

12. A system, comprising:
   a power system comprising a plurality of fuel cells, with each of the fuel cells having an efficiency range; and
   a controller that is configured to coordinate a distribution of a power demand for a power output of the power system in response to a power request, the power output of each of the fuel cells selected based on a respective efficiency of each of the fuel cells.

13. The system of claim 12, wherein the controller is configured to operating each fuel cell in a high efficiency range.

14. The system of claim 12, wherein the controller is configured to supplement the power output of the fuel cells with power from a battery so that the power request is fulfilled during transitions.

15. The system of claim 12, wherein the controller is configured to selectively and sequentially coupling the fuel cells responsive to a requested voltage or power output level.

16. The system of claim 12, further comprising a battery and an engine system, and the controller is configured to distribute the power request across one or both of the battery system and the engine system in addition to the fuel cells.

17. The system of claim 16, wherein coordinating the distribution of the power demand includes increasing a portion of the power demand delivered to the fuel cells while the power demand is less than a threshold, and wherein coordinating the distribution of the power demand includes supplementing power from the fuel cells with power from one or more of the engine system or the battery system while the power demand is less than the threshold.

18. The system of claim 16, further comprising a vehicle supporting the fuel cells, and the controller is configured to adjust the distribution of the power demand based on one or more of: estimated power demands at differing locations along a route defined in a determined trip plan, a fuel reservoir level, emissions regulations according to a region of the determined trip plan, a fuel level in a fuel reservoir configured to fuel the fuel cells, or a state-of-charge of one or more batteries of the battery system.

19. The system of claim 12, wherein coordinating the distribution of the power demand includes distributing the power demand amongst the fuel cells based at least in part on an efficiency of each of the fuel cells.

20. A vehicle, comprising:

one or more electric traction motors;

a fuel cell system electrically coupled to the electric traction motors, and the fuel cell system comprising a plurality of fuel cells; and a controller that is configured with executable instructions stored on non-transitory memory that, when executed, cause the controller to individually operate the fuel cells at a determined efficiency setting to meet a power demand and to activate fuel cells sequentially until the power demand has been met, and the determined efficiency is set to be greater than 90 percent efficient in converting fuel to electricity.

\* \* \* \* \*